(Model.)

C. H. TAYLOR.
Attachment to Grain Separators.

No. 240,478. Patented April 19, 1881.

Witnesses
A. H. Krause
Fred. G. Dieterich

Inventor
Chas. H. Taylor
by Louis Bagger & Co.
Attorneys

UNITED STATES PATENT OFFICE.

CHARLES H. TAYLOR, OF CHICO, CALIFORNIA.

ATTACHMENT TO GRAIN-SEPARATORS.

SPECIFICATION forming part of Letters Patent No. 240,478, dated April 19, 1881.

Application filed November 27, 1880. (Model.)

*To all whom it may concern:*

Be it known that I, CHARLES H. TAYLOR, of Chico, in the county of Butte and State of California, have invented certain new and useful Improvements in Attachments to Grain-Separators; and I do hereby declare that the following is a full, clear, and exact description of the invention, which will enable others skilled in the art to which it appertains to make and use the same, reference being had to the accompanying drawings, which form a part of this specification, and in which—

Figure 1:
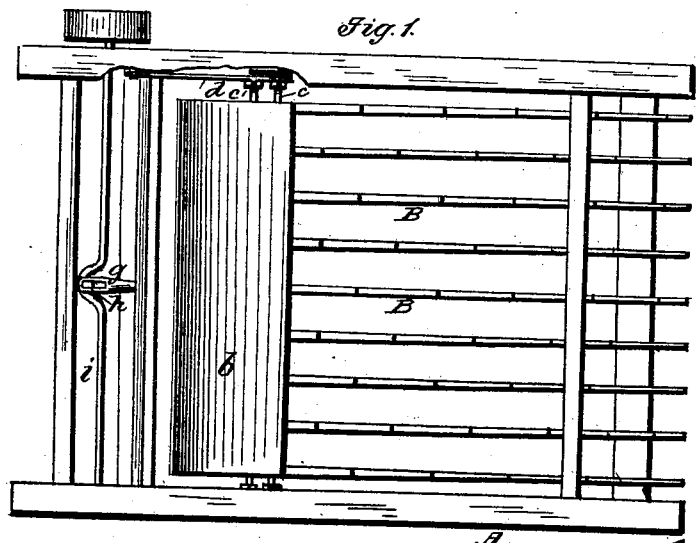
Figure 2:
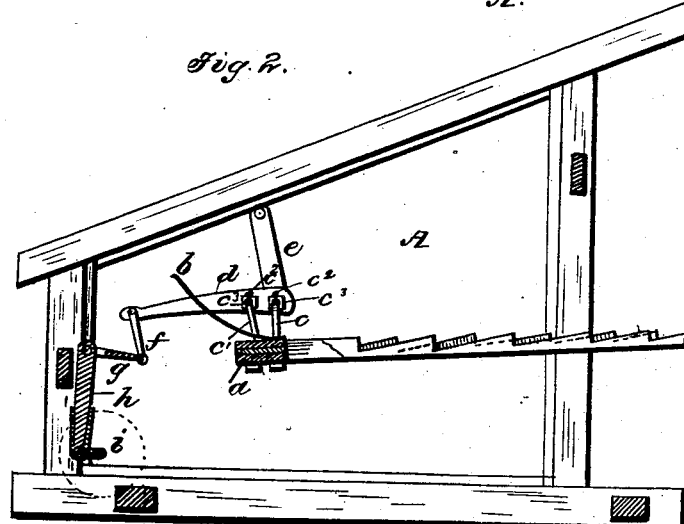
Figure 3:
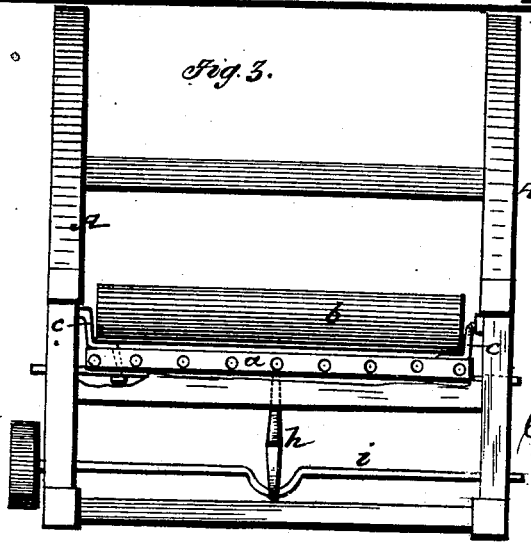

Figure 1 is a plan view of my improved straw and weed attachment for grain-separators. Fig. 2 is a longitudinal section, and Fig. 3 is a front elevation, of the same.

This invention has relation to improvements in attachments for grain-separators adapted to prevent the carrying off of any grain with the straw or weeds; and it consists in the construction and arrangement of parts, as will be more fully hereinafter set forth, and specifically pointed out in the claims.

In the accompanying drawings, the letter A designates a shoe located in practice between the feeding-point of the grain and the grain-sieve below, and B a series of notched or toothed bars extending out a short distance beyond the rear end of the shoe, while their forward ends are fast to a cross-bar, $a$, having an upwardly-curved grain-check board or plate, $b$, fastened to its upper side. This bar is hung by outwardly-curved arms $c\ c'$, attached thereto and to the rear ends of levers $d\ d$, with the same ends pivoted to pivoted pendants $e\ e$, hung in the sides of the shoe A. The forward ends of the levers $d$ are connected to a crank-shaft, $f$, with an arm, $g$, pivoted to a pitman, $h$, in turn connected to a second crank-shaft, $i$, driven by any suitable medium connecting with the motor.

It will be noticed that, the grain, with adhering straw or weeds, &c., falling upon the notched or toothed bars or fingers B, the straw or weeds will be intercepted and carried off by the said bars, while the grain will pass through or between the fingers B to the sieve below. As heretofore, without the shaker, the grain, with the adhering straw or weeds, passes to the shoe grain-sieves. The arms $c'$ pass through slots $c^2$ in the rear ends of the levers $d$, and have nuts $c^3$, by which the inclination of the fingers may be adjusted at will.

Having thus fully described my invention, I claim and desire to secure by Letters Patent of the United States—

1. The cross-bar having notched bars B and arms $c\ c'$, combined with the levers $d\ d$, having slots $c^2$ and adjusting-nuts $c^3$, as and for the purposes set forth.

2. The cross-bar $a$, having arms $c\ c'$ and notched fingers B, the levers $d\ d$, having slots $c^2$, and adjusting-nuts $c^3$, in combination with crank-shaft $f$, arm $g$, pitman $h$, and crank-shaft $i$, and with suitable operating motive power, as and for the purposes set forth.

In testimony that I claim the foregoing as my own I have hereto affixed my signature in presence of two witnesses.

CHARLES H. TAYLOR.

Witnesses:
 H. C. SILVER,
 T. L. FORD.